United States Patent
Lomas et al.

(10) Patent No.: US 6,424,424 B1
(45) Date of Patent: Jul. 23, 2002

(54) METHOD AND APPARATUS FOR AUTOMATIC INSTALLATION OF SHARED PRINTERS OVER A NETWORK

(75) Inventors: James W. Lomas; Harold T. McMillan; Steve R. Wiley, all of Boise, ID (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/233,290

(22) Filed: Jan. 19, 1999

(51) Int. Cl.⁷ .................................. G06F 1/00
(52) U.S. Cl. .................. 358/1.14; 358/1.16; 358/1.13; 358/1.15; 709/220; 709/327
(58) Field of Search ................. 358/1.15, 1.14, 358/1.16, 1.13; 709/327, 228, 203, 216, 217, 218, 220; 707/10

(56) References Cited

U.S. PATENT DOCUMENTS

| | | | | |
|---|---|---|---|---|
| 5,657,448 A | * | 8/1997 | Wadsworth et al. | 395/200.5 |
| 5,692,111 A | * | 11/1997 | Marbry et al. | 395/114 |
| 5,742,829 A | * | 4/1998 | Davis et al. | 395/712 |
| 5,819,015 A | * | 10/1998 | Martin et al. | 395/114 |
| 5,859,969 A | * | 1/1999 | Oki et al. | 395/200.3 |
| 5,931,909 A | * | 8/1999 | Taylor | 709/221 |
| 6,006,035 A | * | 12/1999 | Nabahi | 395/712 |
| 6,075,943 A | * | 6/2000 | Feinman | 395/712 |
| 6,094,679 A | * | 7/2000 | Teng et al. | 709/220 |
| 6,125,372 A | * | 9/2000 | White | 707/205 |
| 6,192,518 B1 | * | 2/2001 | Neal | 717/11 |
| 6,195,171 B1 | * | 2/2001 | Ochiai | 358/1.15 |
| 6,246,485 B1 | * | 6/2001 | Brown et al. | 358/1.13 |
| 6,301,012 B1 | * | 10/2001 | White et al. | 358/1.15 |
| 6,301,710 B1 | * | 10/2001 | Fujiwara | 717/11 |

* cited by examiner

Primary Examiner—Edward Coles
Assistant Examiner—Tia A Carter

(57) ABSTRACT

The method of the invention enables installation of a network printer onto a client processor and employs a server for managing printer installations. Initially, the server receives a printer identifier message from the network printer and then creates an executable installation program using identifier information from the printer identifier message. Thereafter, the server transmits an e-mail message to the client processor, which e-mail message includes an executable printer driver installation program. Upon receipt of the e-mail message, the client processor recognizes the executable installation program and, upon installation thereof, to utilize the network printer.

16 Claims, 2 Drawing Sheets

METHOD AND APPARATUS FOR AUTOMATIC INSTALLATION OF SHARED PRINTERS OVER A NETWORK

FIELD OF THE INVENTION

This invention relates to a method and apparatus for enabling remote installation of printer driver software onto a client processor, the software allowing access to a shared network printer and, more particularly, to use of an E-Mail message to accomplish such an installation.

BACKGROUND OF THE INVENTION

Enabling a client processor to employ a newly added printer over a network connection is often a complex task. To provide for installation of such a newly added printer, an administrator generally must first configure a print queue on a print server that is coupled to the network. Then, print queues must be configured on each network-connected computer that is to serve as a client for the new printer.

The most common method used today to enable installation of printer driver software onto a network-connected client processor is via manual notification. More specifically, the network administrator verbally informs users of the presence of a new network printer and then manually sets up the new printer driver software on each client work station. This procedure is both tedious and expensive for the administrator, especially if the clients are located at remote sites.

Another prior art method for installation of such software on a network-connected client processor involves the administrator sending an E-Mail message to each of the interested users that describes the process for installation of the new network printer. Each user is then, individually, responsible for such installation on his/her client processor. To accomplish such installation, each user must enter the various configuration parameters for the new printer on the local client processor. This technique is used by the Microsoft "Point-and-Print" procedure. Experience has shown that many users do not understand the process and require assistance to correct errors that have been made during the installation process.

A still further method for enabling a network printer driver software installation on a client processor involves a technique utilized by the Novell Distributed Print System (NDPS). The NDPS procedure requires the installation of specialized client software on each of the user's machines, which client software enables detection of a message and installation of new network printer driver software. The disadvantage of the NDPS procedure is that it requires an administrator to install the specialized software on each client machine.

Presently, the Microsoft "Windows" operating system ("Windows" is a trademark of the Microsoft Corporation, Redmond, Wash.), includes a procedure which recognizes an ".exe" extension on a received program handle as an executable program. The Windows operating system can then automatically execute an installation of the .exe program so long as the remainder of the program handle includes any necessary instruction data, such as an "install" indication.

Accordingly, it is an object of this invention to provide an improved method and apparatus for installation of a printer driver program for a newly connected, shared network printer onto a network-connected client processor.

It is a further object of this invention to provide a method and apparatus for enabling a client processor to install printer driver software for a network-connected printer, wherein the user is not required to enter printer-related parameters into the installation program.

It is still another object of this invention to enable a client processor that is connected to a network to automatically install a printer driver for a network printer, wherein the client processor requires no special software to accomplish the installation program.

SUMMARY OF THE INVENTION

The method of the invention enables installation of a network printer onto a client processor and employs a server for managing printer installations. Initially, the server receives a printer identifier message from the network printer and then creates an executable installation program using identifier information from the printer identifier message. Thereafter, the server transmits an e-mail message to the client processor, which e-mail message includes an executable printer driver installation program. Upon receipt of the e-mail message, the client processor recognizes the executable installation program and, upon installation thereof, is enabled to utilize the network printer.

DETAILED DESCRIPTION OF THE INVENTION

Figure 1:
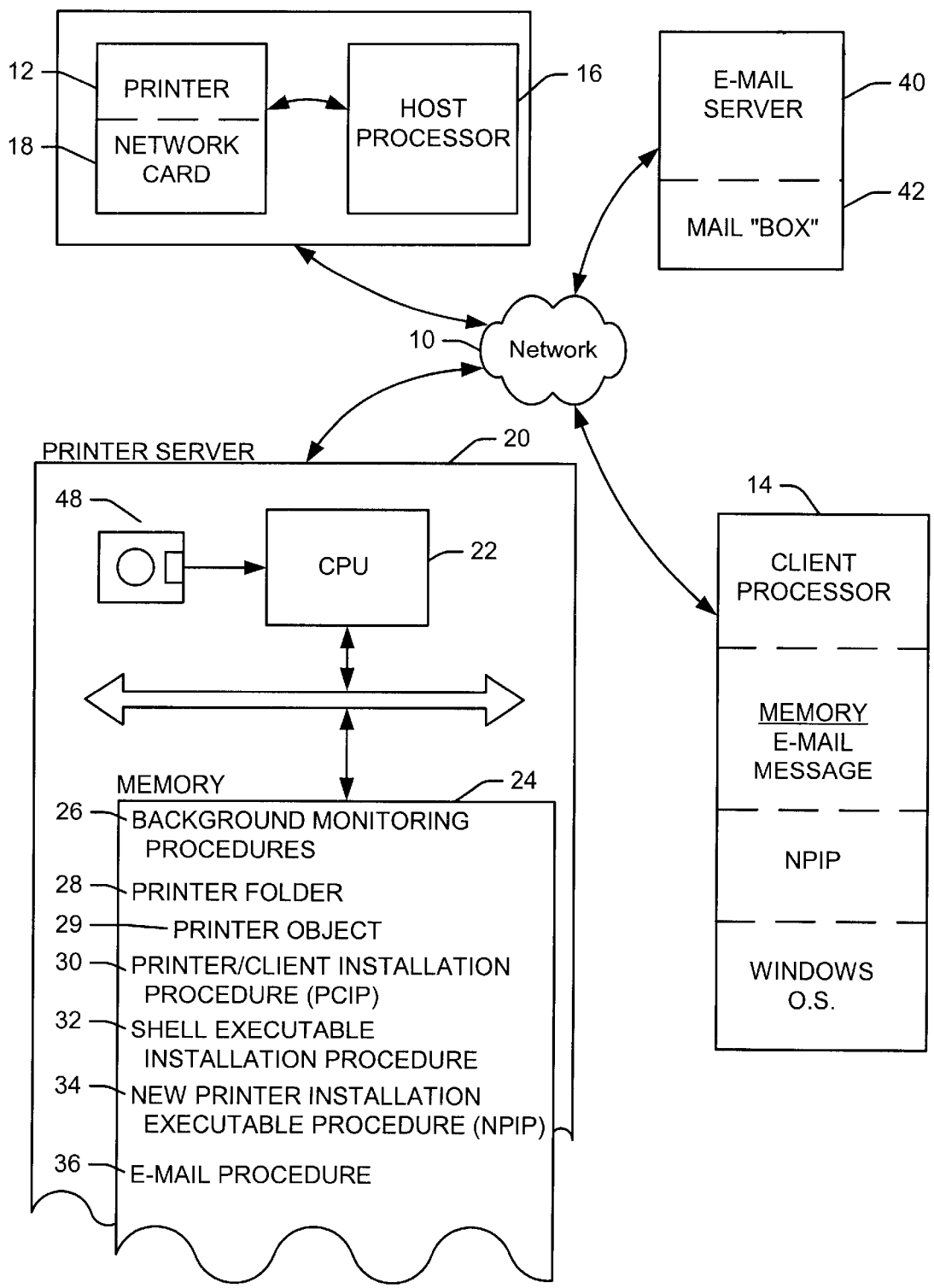
FIG. 1 is a block diagram of a system incorporating the invention.

A primary objective of the invention is to enable installation of printer driver software for a network printer onto a client processor, without requiring substantial user intervention in the process. Accordingly, as shown in FIG. 1, a network 10 includes a plurality of processing elements connected thereto. Initially, assume that it is desired to connect printer 12 to network 10 and to enable it to be utilized by one or more client processors 14, without requiring the operators of client processors 14 to be involved in installing the printer driver software. Printer 12, in this instance, is coupled to a host processor 16 and further includes a network card 18. Network card 18 enables printer 12 to recognize an interconnection to network 10 and, in conjunction with host processor 16, to perform certain network-related identifier functions.

In specific, network card 18, upon sensing an occurrence of a network connection, causes printer 12, under control of host processor 16, to issue a Service Location Protocol (SLP) packet onto network 10. An SLP packet includes, among other data, the printer's name, its model number, its hardware address, its host's name and its IP address.

A server 20 is coupled to network 10 and includes a central processing unit (CPU) 22 that is coupled to a memory 24 which includes a number of procedures that are utilized to carry out the invention. More specifically, memory 24 includes a background monitoring procedure 26 which continually monitors data flowing on network 10 and, in this instance, recognizes the presence of an SLP packet message thereon. Upon sensing an SLP packet, server 20 checks to determine if printer folder 28 has a printer object for printer 12. Assuming that no such printer object exists, server 20 creates a printer object 29 with the data acquired from the SLP packet issued by printer 12.

A printer/client installer procedure 30 (hereafter referred to as PCIP 30) monitors printer folder 28 and detects the addition of a new printer object (e.g. printer object 29). PCIP 30 then configures an executable printer installation program for the one or more client processors 14 that may wish to utilize new printer 12. To accomplish such configuration, PCIP 30 accesses a shell executable installation program 32 and, employing the identifier data from printer object 29, populates shell executable installation program 32 with the necessary parameters received from printer 12. This results in the creation of a new printer executable installation program (NPIP) 34.

Thereafter, PCIP 30 causes e-mail procedure 36 to prepare an e-mail message to a group of client processors (of which client processor 14 is one) and to attach NPIP 34 thereto. That e-mail message is then dispatched to its recipients, including client processor 14, via an e-mail server 40 that is coupled to network 10.

In the known manner, e-mail server 40 stores the e-mail message along with NPIP 34 in a mailbox 42 reserved for client processor 14. Thereafter, when a user causes client processor 14 to log-on to e-mail server 40, a download of the contents of mailbox 42 is enabled, and the e-mail message and attached NPIP 34 are loaded into the memory 44 in client processor 14. Assuming that client processor 14 includes the Windows operating system and, further, that the data in NPIP 34 has an appropriate suffix (e.g, .exe), the Windows operating system recognizes the attached NPIP 34 messages as an executable program. The user may then undertake to install NPIP 34 onto client processor 14. Importantly, the user is not required to enter any printer or network partameters to accomplish the installation. Such installation adds the name of printer 12 to a list of network printers available for use by client processor 14 and a printer access procedure with all necessary data to enable communications between client processor 14 and printer 12, without requiring further user intervention.

Accordingly, a system administrator, operating server 20 can easily inform interested client processors of newly installed network printers simply by dispatching e-mail messages to the respective client processors. Further, users of the new network printer can install the printer driver software onto their client processors by running a delivered executable, either automatically, or with user intervention. Since the executable is customized for each printer, no user inputs are required and thus the chance for error is minimized. Further, the invention does not require any specialized software on the client processors to perform the installation. Any commonly available e-mail client software, running under a Windows operating system will operate the invention.

The description above has assumed that each of the software procedures required to perform the method of the invention are already loaded into memory 24 on server 20. Those skilled in the art will understand that the procedures stored in memory 24 can also be incorporated into a memory media device 48, so as to be available on an as-needed basis by CPU 22. Further, it is to be understood that the controlling software in memory 24 is likely to be delivered to server 20, either directly via memory media 48 or by a further client processor downloading the code from memory media 48 to server 20.

Figure 2:
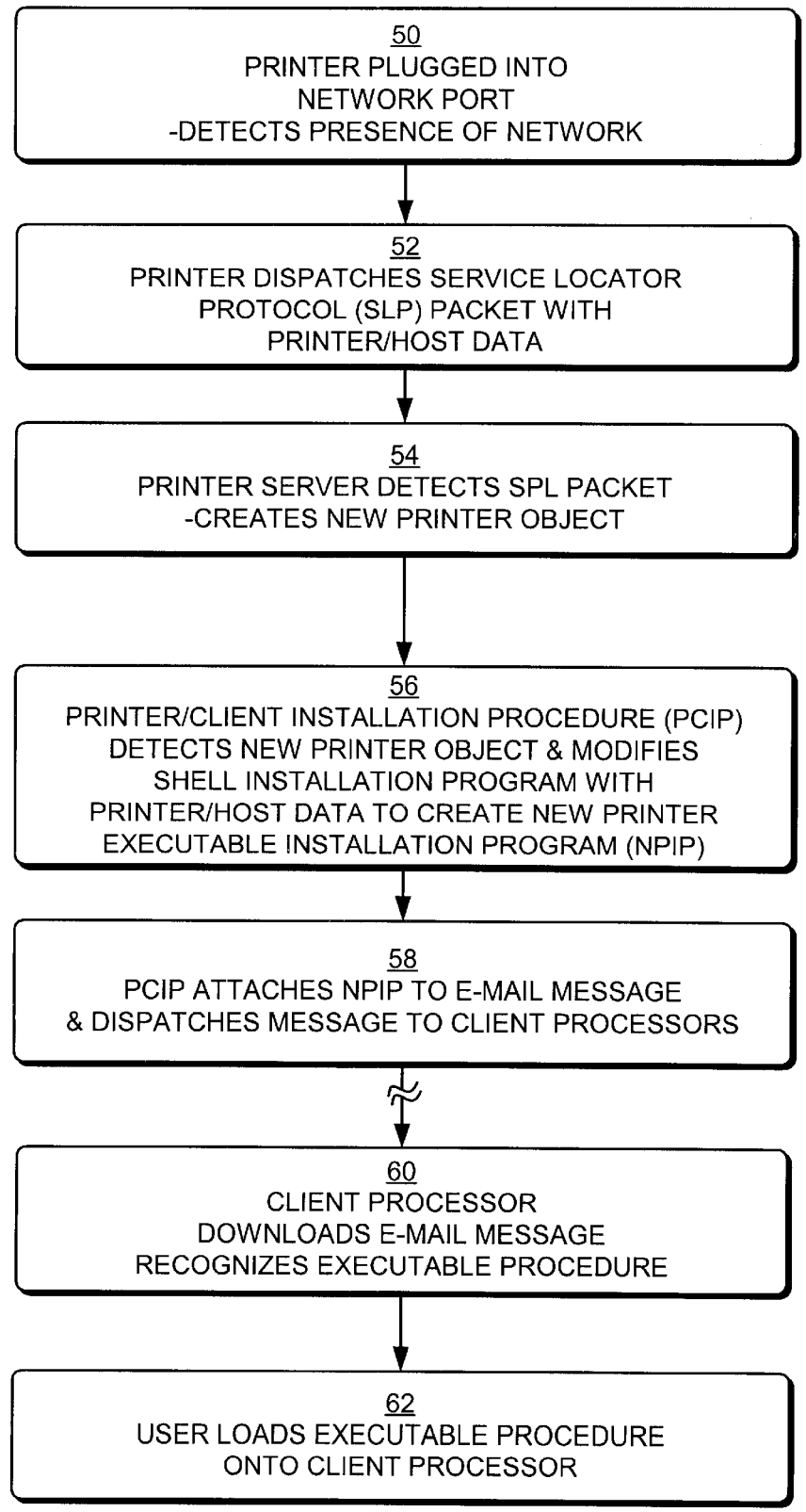
FIG. 2 is a logical flow diagram illustrating the method of the invention.

Turning now to FIG. 2, the method of the invention is illustrated in the form of a logical flow diagram. Initially, it is assumed that new printer 12 is plugged into a network terminal and a network card 18 installed on the new printer, detects the presence of network 10 (step 50). Thereafter, network card 18, in conjunction with Host Processor 16 that controls new printer 12 causes dispatch of an SLP packet (step 52). As indicated above, the SLP packet includes the printer's name, its model number, hardware address, host name, IP address, etc.

Thereafter, print server 20 detects the SLP packet and creates a new printer object 29 in its printer folder 28 (step 54). Upon detecting the creation of new printer object 29, printer/client installer procedure (PCIP) 30 modifies shell executable installation procedure 32 with the new printer parameters and creates a new printer executable installation program (NPIP) 34 (step 56).

PCIP 30 then attaches NPIP 34 to an e-mail message. As above-indicated, the e-mail message includes whatever suffix is required to enable a client processor operating system to recognize the message as executable.

Thereafter, PCIP 30 dispatches the e-mail message to the client processors that are listed as desiring such messages, e.g., client processor 14 (step 58). At some later time, each client processor downloads the e-mail message, along with its attached NPIP 34 (step 60).

Under control of their respective operating systems, the respective client processors recognize the executable state of the NPIP 34. A user at each respective client processor may then proceed with installation. To accomplish such installation, the user needs not enter any data regarding the new printer into NPIP 34 but rather, just to "install" the program on the client processor (step 62).

It should be understood that the foregoing description is only illustrative of the invention. Various alternatives and modifications can be devised by those skilled in the art without departing from the invention. For instance, it has been assumed that printer server 20 becomes aware of printer 12 as a result of a message received via network 10. The invention also contemplates that printer server 20 could become aware of network printer 12 as a result of a direct input of the printer identification data to printer server 20 by a system administrator. Accordingly, the present invention is intended to embrace all such alternatives, modifications and variances which fall within the scope of the appended claims.

What is claimed is:

1. A method for enabling installation, via a network, of a network printer onto a client processor, said network including a printer server for managing printer installations, said printer server including a memory for registering printers served thereby, said printer server performing the method comprising the steps of:

a) recognizing a connection to said network of said network printer, and in response, issuing onto said network a service locator protocol message, including said printer identifier information, said printer server receiving said service locator protocol message and storing in said memory said printer identifier information;

b) recognizing that a printer identifier of a network printer has been added to said memory;

c) creating an executable installation program, using printer identifier information from said printer identifier; and d) transmitting an e-mail message to said client processor, said e-mail message including said executable installation program, whereby, upon receipt of said e-mail message, said client processor is enabled to recognize said executable installation program and, upon installation thereof, to utilize said network printer via said network.

2. The method as recited in claim 1, wherein said printer server, in step d) attaches said executable installation program as an attachment to said e-mail message.

3. The method as recited in claim 1, wherein step c) further comprises:

accessing a shell installation program and employing said printer identifier information to alter said shell installation program to said executable installation program.

4. A memory media for controlling a printer server to enable installation of a network printer onto a client processor, via a network interconnection, said printer server including a memory for registering network printers served thereby, said memory media comprising:

a) means for recognizing a connection to said network of said network printer, and in response, issuing onto said network a service locator protocol message, including said printer identifier information, said printer server receiving said service locator protocol message and storing in said memory said printer identifier information;

b) means for controlling said printer server to recognize that printer identifier information of a network printer has been added to said memory;

c) means for controlling said printer server to create an executable installation program, using said printer identifier information; and d) means for controlling said printer server to transmit an e-mail message to said client processor, said e-mail message including said executable installation program, whereby, upon receipt of said e-mail message, said client processor is enabled to recognize said executable installation program and, upon installation thereof, to utilize said network printer via said network.

5. The memory media as recited in claim 4, wherein said means d) attaches said executable installation program as an attachment to said e-mail message.

6. The memory media as recited in claim 4, wherein means c) accesses a shell installation program and employs said printer identifier information to alter said shell installation program to said executable installation program.

7. A printer server for enabling installation of a network printer onto a client processor, said printer server including a processor and a memory for registering printers served thereby, and further comprising:

a) recognizing means for the network printer to recognize a connection to said network of said network printer, and in response, issuing onto said network a service locator protocol message, including said printer identifier information which is received and recognized by said monitoring means;

b) monitoring means for enabling said processor to recognize that printer identifier information regarding a network printer has been added to said memory;

c) a printer/client installation procedure for controlling said processor to create an executable installation program, using said printer identifier information; and d) means for transmitting an e-mail message to said client processor, said e-mail message including said executable installation program, whereby, upon receipt of said e-mail message, said client processor is enabled to recognize said executable installation program and, upon installation thereof, to utilize said network printer via said network.

8. The printer server as recited in claim 7, wherein said means d) attaches said executable installation program as an attachment to said e-mail message.

9. The printer server as recited in claim 7, wherein said printer/client installation procedure accesses a shell installation program and employs said printer identifier information to alter said shell installation program to said executable installation program.

10. The method as recited in claim 3, wherein said printer server, in step d) attaches said executable installation program as an attachment to said e-mail message.

11. The memory media as recited in claim 6, wherein said means d) attaches said executable installation program as an attachment to said e-mail message.

12. The printer server as recited in claim 9, wherein said means d) attaches said executable installation program as an attachment to said e-mail message.

13. A processor-readable media, containing processor-executable instructions for enabling installation, via a network, of a network printer onto a client processor, said network including a printer server for managing printer installations, said printer server including a memory for registering printers served thereby, wherein said processor-executable instructions:

a) recognize a connection to said network of said network printer, and in response, issuing onto said network a service locator protocol message, including said printer identifier information, said printer server receiving said service locator protocol message and storing in said memory said printer identifier information;

b) recognize that a printer identifier of a network printer has been added to said memory;

c) create an executable installation program, using printer identifier information from said printer identifier; and d) transmit an e-mail message to said client processor, said e-mail message including said executable installation program, whereby, upon receipt of said e-mail message, said client processor is enabled to recognize said executable installation program and, upon installation thereof, to utilize said network printer via said network.

14. The method as recited in claim 13, wherein said printer server, in step d) attaches said executable installation program as an attachment to said e-mail message.

15. The method as recited in claim 13, wherein step c) further comprises:

accessing a shell installation program and employing said printer identifier information to alter said shell installation program to said executable installation program.

16. The method as recited in claim 15, wherein said printer server, in step d) attaches said executable installation program as an attachment to said e-mail message.

* * * * *